C. F. MANUEL & D. M. LEONARD.
Improvement in Spring Bed-Bottoms.

No. 114,955.  Patented May 16, 1871.

Witnesses:
C. Raettig
Wm. H. C. Smith

Inventors:
C. F. Manuel
D. M. Leonard per
Attorneys.

United States Patent Office.

CALVIN F. MANUEL AND DANIEL M. LEONARD, OF LA CROSSE, WISCONSIN.

Letters Patent No. 114,955, dated May 16, 1871.

IMPROVEMENT IN SPRING BED-BOTTOMS.

The Schedule referred to in these Letters Patent and making part of the same.

*To all whom it may concern:*

Be it known that we, CALVIN F. MANUEL and DANIEL M. LEONARD, of La Crosse, in the county of La Crosse and State of Wisconsin, have invented a new and useful Improvement in Spring Bed-Bottom; and we do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
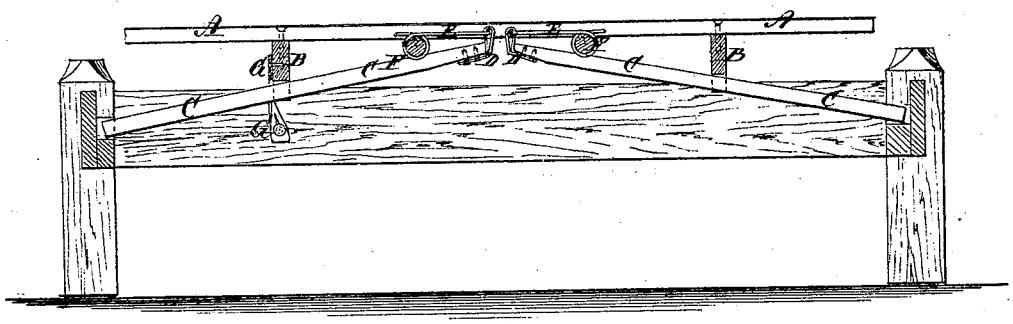
Figure 1 is a vertical longitudinal section of our improved spring bed-bottom taken through the line $x$ $x$, fig. 2.
Figure 2:
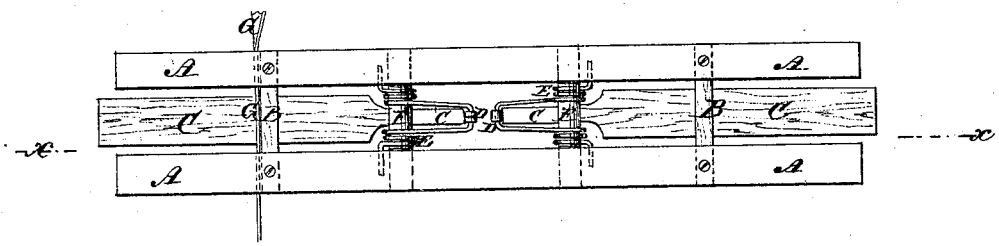
Figure 2 is a top view of a set or section of the spring.

Our invention has for its object to furnish an improved spring bed-bottom, simple in construction, effective in operation, and reliable in use, not being liable to get out of order, wear out, or break; and It consists in the wire springs and connecting-leathers, in combination with the levers and horizontal bars of the bed-bottom, as hereinafter more fully described.

A are the horizontal slats upon which the bed is laid.

The slats A run longitudinally with the bed, and are arranged in pairs, the bars of each pair being connected toward their ends by short cross-bars B, to which the said slats are securely attached.

The lower edges of the short cross-bars B rest upon the upper sides of the levers C, the outer ends of which rest in notches formed in the head and foot-boards of the bedstead, or in cleats attached to said head and foot-boards.

The levers C are made of such a length as to almost meet when pressed down into a horizontal position, and to their inner ends are attached straps D, which are passed around the loops of the coiled-wire springs E, the ends of which are driven into the inner edges of the horizontal bars A.

Through the coils of the springs E are passed short round bars F, the ends of which are secured to the said horizontal bars A.

The sections or sets of springs may be kept in place laterally by straps or cords, G, attached to the short cross-bars B, and the ends of which are attached detachably to the side rails of the bedstead.

Having thus described our invention,

We claim as new and desire to secure by Letters Patent—

The coiled-wire springs E, leather straps D, and short round cross-bars F, in combination with the horizontal slats A, short cross-bars B, and levers C, substantially as herein shown and described, and for the purpose set forth.

CALVIN F. MANUEL.
      DANL. M. LEONARD.

Witnesses:
 WM. S. BURROUGHS,
 MALCOLM GRAHAM.